United States Patent
Braun et al.

[19]

[11] Patent Number: 6,109,151

[45] Date of Patent: Aug. 29, 2000

[54] METHOD AND DEVICE FOR POSITION EXACT AND DIMENSION EXACT CHAMFERING OF A PIPE END

[75] Inventors: Hans-Jörg Braun, Hagen-Berchum; Gerhard Mohn, Bergneustadt, both of Germany

[73] Assignee: Maschinenfabrik Reika-Werke GmbH, Germany

[21] Appl. No.: 08/857,810

[22] Filed: May 16, 1997

Related U.S. Application Data

[62] Division of application No. 08/666,402, Jun. 11, 1996, Pat. No. 5,778,744.

[30] Foreign Application Priority Data

Dec. 11, 1993 [DE] Germany .......................... 434 23 256
Dec. 10, 1994 [EP] European Pat. Off. .. PCT/EP94/04110

[51] Int. Cl.⁷ .................................................. B23B 5/16
[52] U.S. Cl. ............................... 82/48; 82/70.2; 82/118; 82/113; 82/134
[58] Field of Search ............................... 82/113, 1.2, 1.4, 82/131, 124, 149, 47, 48, 70.2, 118, 123, 133, 134; 408/2, 13

[56] References Cited

U.S. PATENT DOCUMENTS

| | | | |
|---|---|---|---|
| 3,891,835 | 6/1975 | Shoda et al. ................................ | 408/2 |
| 4,203,691 | 5/1980 | Nishimura et al. ......................... | 408/2 |
| 4,324,049 | 4/1982 | Blose ..................................... | 33/199 B |
| 4,774,753 | 10/1988 | Holy et al. ............................... | 29/568 |
| 4,840,096 | 6/1989 | Martin et al. ............................. | 82/131 |
| 4,860,499 | 8/1989 | Dinger et al. ............................. | 408/2 |
| 5,197,361 | 3/1993 | Carrier et al. ............................ | 82/1.2 |

*Primary Examiner*—Henry W. H. Tsai
*Attorney, Agent, or Firm*—Robert W. Becker & Associates

[57] ABSTRACT

In a method for machining a chamfer at a pipe end, clamped in a radial clamping device, to exact positional and dimensional tolerances as a function of a measured course of an inner and an outer diameter of the pipe, an actual position of the pipe end clamped in the radial clamping device is determined with a first sensing device. Based on the determined actual position, in a controlled manner a machining tool is quickly advanced to the pipe end. With a second sensing device at least one of the actual inner diameter of the pipe and the actual outer diameter of the pipe is determined, and optionally the course of one of the actual inner diameter and the actual outer diameter about the circumference of the pipe is also determined. The machining tool is adjusted based on one of the actual inner diameter, the actual outer diameter, the nominal inner diameter and the nominal outer diameter. The chamfer is rough-machined with a great advancing rate with the adjusted machining tool to a state in which a machining allowance for a subsequent finish-machining step is provided. The chamfer is then finish-machined with minimal advancing rate to the exact positional and dimensional tolerances as a function of the course of one of the inner diameter and the outer diameter.

13 Claims, 1 Drawing Sheet

METHOD AND DEVICE FOR POSITION EXACT AND DIMENSION EXACT CHAMFERING OF A PIPE END

This application is a division, of application Ser. No. 08/666,402 filed Jun. 11, 1996, now U.S. Pat. No. 5,778,744.

BACKGROUND OF THE INVENTION

The invention relates to a method and a device for position-exact and dimension-exact chamfering of a clamped pipe end with respect to the outer or inner diameter of the pipe, especially for producing a welding chamfer, which must be applied, in general, with great precision with respect to the inner surface of the pipe, in order to be able to produce a welding connection between abutting pipe ends with respect to all specifications. The manufacture of such a welding chamfer is problematic because a considerable deviation from roundness as well as wall thickness variations due to radial displacement of the inner diameter relative to the outer diameter may occur in seamless pipes. Even though welded pipes have no great wall thickness variation, these pipes may have a greatly oval contour and, in the area of the welding seam, may exhibit bulges at the interior and/or exterior. Furthermore, for seamless and welded pipes a diameter deviation is generally acceptable which, however, does not ensure an exact welding seam preparation without taking into consideration the actual inner or outer diameter of the pipe.

The deviation from roundness of the pipe can be compensated according to U.S. Pat. No. 3,724,303, in which a device for combined cutting and chamfering of pipe ends is disclosed, by arranging the chamfering tool on a workpiece holder which is elastically supported via a roller or a ball on the outer surface of the pipe. In this manner, an outer chamfer as well as an inner chamfer can be applied position-exact and dimension-exact relative to the outer circumference of the pipe. When it is desired to apply an outer and/or inner chamfer position-exact and dimension-exact relative to the inner surface of the pipe, the tool holder must be supported in a similar manner at the inner surface of the pipe. This known device thus operates according to the tracing method with a mechanical sensing device which is directly operatively coupled with the chamfering device.

This known device is disadvantageous because the machining process of chamfering is not dividable into a fast rough-machining process and a slower finish-machining process so that the advance for the entire machining process must be based on the required surface quality to be produced with the finish-machining process. Accordingly, the machining time is unnecessarily long because only a small cutting output is achievable. Furthermore, an irregular surface of the chamfer will result when the tracing device runs across cuttings or a welding seam bulge which negatively affects the quality of the chamfer to be produced.

It is an object of the invention to provide a method and device with which a pipe end can be chamfered position-exact and dimensionexact with respect to the outer or inner diameter of the pipe and with which the chamfer remains unaffected by a deviation from roundness, by wall thickness deviations, cuttings or welding seam bulges.

SUMMARY OF THE INVENTION

Based on this object, a method is suggested which inventively is performed such that first in a fast rough-machining process with great advance rate the chamfer is produced with a machining allowance for a subsequent finish-machining process, whereby a machining tool is first adjusted to the nominal or actual inner or outer diameter of the pipe and subsequently the chamfer is procuded position-exact and dimension-exact in a short finish machining process with low advance rate with the same or another chamfering tool as a function of the course of the outer or inner diameter along the circumference of the pipe determined with a sensing device.

The method for machining a chamfer at a pipe end, clamped in a radial clamping device, to exact positional and dimensional tolerances as a function of a measured course of an inner and an outer diameter of the pipe, according to the present invention comprises the steps of:

a) determining with a first sensing device an actual position of the pipe end clamped in the radial clamping device;

b) quickly advancing, based on the determined actual position, in a controlled manner a machining tool to the pipe end;

c) determining with a second sensing device at least one of the actual inner diameter of the pipe and the actual outer diameter of the pipe, and optionally determining the course of one of the actual inner diameter and the actual outer diameter about the circumference of the pipe;

d) adjusting the machining tool based on one of the actual inner diameter, the actual outer diameter, the nominal inner diameter and the nominal outer diameter;

e) rough-machining with a great advancing rate the chamfer with the adjusted machining tool to a state in which a machining allowance for a subsequent finish-machining step is provided; and f) finish-machining with minimal advancing rate the chamfer to the exact positional and dimensional tolerances as a function of the course of one of the inner diameter and the outer diameter.

The method preferably further comprises the step of using the same machining tool for the step of finish-machining.

The method may further comprise the step of using a different machining tool for the step of finish-machining.

The method may also further comprise the step of pressing the pipe end to a circular shape with the radial clamping device before step a).

In the step c) one of the actual inner diameter and the actual outer diameter is measured.

In the step d) the machine tool is adjusted to at least one of the nominal inner and outer diameters.

In the step c) one of the actual inner diameter and the actual outer diameter is measured and in the step d) the machining tool is adjusted to a minimal value of the machining allowance based on the determined course of one of the actual inner diameter and the actual outer diameter.

The step c) includes saving the determined course of one of the actual inner diameter and the actual outer diameter, and in the step f) the saved determined course of one of the actual inner diameter and the actual outer diameter is used.

The step f) includes determining with the second sensing device the course of one of the actual inner diameter and the actual outer diameter about the circumference of the pipe and directly employing the determined course for finish-machining the chamfer to the exact positional and dimensional tolerances.

The method may further comprise, after the step c), the step of horizontally positioning the axis of the pipe by determining a deviation of the determined diameter, selected from the actual inner diameter and the actual outer diameter, from the respective nominal inner diameter and outer diameter and accordingly correcting the position of the pipe.

The present invention also relates to a device for machining a chamfer at a pipe end. The device is primarily characterized by:

- a clamping device for the pipe end;
- at least one radially adjustable machining tool rotatable relative to the clamping device about an axis of the pipe end;
- a sensing device rotatable relative to the clamping device about an axis of the pipe end for determining at least one of the actual inner diameter of the pipe and the actual outer diameter of the pipe and the course of one of the actual inner diameter and the actual outer diameter about the circumference of the pipe;
- a control device connected to the sensing device for adjusting the at least one machining tool for an exact positional and dimensional chamfering as a function of the course of the one of the actual inner diameter and the actual outer diameter about the circumference of the pipe;
- the clamping device comprising an axial displaceable clamping piston for actuating radially acting clamping jaws;
- a first travel pick-up for determining the actual outer diameter of the pipe based on the travel of the clamping piston.

The device may further comprise an abutment moveable axially to a limited extent toward the pipe end. A second travel pick-up is preferably connected to the abutment for determining the actual position of the clamped pipe end relative to the at least one machining tool.

The device may further comprise a planar disk, wherein the at least one machining tool is connected thereto so as to be radially adjustable, the planar disk arranged and driven coaxially to the clamping device.

The sensing device is connected to the planar disk and the planar disk comprises a drive unit. The device may further comprise a base plate to which the planar disk and the drive unit are connected so as to be axially displaceable relative to the clamping device.

Advantageously, a height-adjustable support for the pipe spaced from the clamping device may be provided.

The device may further comprise a lifting table, wherein the clamping device and the planar disk with the drive unit are connected to the lifting table.

The lifting table and the height-adjustable support each have a height-adjusting mechanism connected to the control device, wherein the height-adjusting mechanisms are positioned at a same level as the axis of the pipe in the area of the support and of the clamping device relative to a nominal diameter of the pipe and subsequently, after determination of the actual diameter of the pipe with one of the first pick-up and the sensing device, are adjusted to a horizontal position of the axis of the pipe end in the clamping device as a function of the determined actual diameter.

The sensing device is a tracing sensor operatively connected to the at least one machining tool.

The sensing device is a mechanical tracing sensor directly coupled to the at least one machining tool.

The tracing sensor is operatively coupled via the control device to the at least one machining tool.

The sensing device is selected from the group consisting of a contactless tracing sensor and a contacting tracing sensor.

The at least one machining tool comprises a rough-machining tool radially displaceably connected to the planar disk and a finish-machining tool radially displaceable connected to the planar disk so as to be displaced relative to the rough-machining tool, wherein radial displacement of the finish-machining tool is controlled by the sensing device.

The inventive machining process thus consist of radially or axially advancing the machining tool into a position at an abutment adjusted to the pipe diameter for performing the rough-machining process whereby the deviation from roundness of the pipe and the wall thickness deviations are taken into considerations only to such an extent that with the rough-machining process at no location of the circumference of the pipe the required machining allowance falls short of its minimum, while the finish-machining process is performed in a controlled manner such that with a sensing device the course of the outer or inner diameter along the circumference of the tube is determined and the machining tool is correspondingly radially adjusted.

When the actual position of the clamped pipe end is detected with a sensing device, the chamfering tool, taking into account the actual position of the pipe end, can be advanced to the pipe end in a fast and controlled manner so that optionally a differentiation between a fast rough-machining process and the finish-machining process is obsolete, respectively, both machining processes can be preformed with the same machining tool in an accelerated fashion.

Based on the aforementioned object, a variant of the method that is especially suitable for thin-walled pipes with substantially uniform wall thickness, especially welded pipes, is suggested. Inventively, it is performed such that first the pipe end is pressed to a substantially circular shape with a radial clamping device, subsequently the actual outer or inner diameter is measured, and the chamfer is then machined position-exact and dimension-exact as a function of the determined actual inner or outer diameter of the pipe end. This method is based on the idea that for a tube with a substantially uniform wall thickness it is only important to have a substantially circular pipe end, which is produced with a radial clamping device, in order to then apply the chamfer corresponding to the measured actual outer diameter or inner diameter in a position-exact and dimension-exact manner because in this case the course of the outer or inner diameter does not deviate from a circular shape, i.e., there is no oval contour and also no central displacement of the outer diameter relative to the inner diameter as is observed for seamless, drawn thick-walled pipes.

When before chamfering the actual position of the clamped pipe end is determined with a sensor, the chamfering tool can be advanced in a controlled and fast manner while taking into account the actual position of the pipe end so that the chamfer can be applied in a direct position-exact and dimension-exact fashion as a function of the determined actual inner or outer diameter of the pipe end, optionally by first performing a rough-machining process with great advance rate with a machining tool adjusted to the nominal or actual outer or inner diameter of the pipe end, including a machining allowance for the subsequent finish machining process, whereby the machining tool can be a different or the same chamfering tool used also for performing the finish-machining process.

For the rough-machining process, the machining tool, before machining a batch of pipes with the same nominal diameter, can be adjusted to the nominal value of the outer or inner diameter of the pipe. In this case, the machining allowance for the finish-machining process must be selected such that wall thickness deviations and deviation from roundness of the pipe, that are known from practice, are taken into account.

In order to have to remove as little material as possible during the finish-machining process, so that the machining time can be further reduced, the actual outer or inner diameter can be measured before the rough-machining process and the machining tool, for performing the rough-machining process, can be adjusted to a minimal value of machining allowance for the finish-machining process by taking into account the course of the outer of inner diameter.

When a control device for controlling the different machining steps is provided, especially in the form of CNC control with a memory, the course of the outer and inner diameter can be determined before the finish machining process with the sensing device, can be saved in the control device, and used for controlling the position-exact and dimension-exact machining of the chamfer in the finish-machining process based on the course of the outer or inner diameter. This can also already take place before the rough-machining process so that the adjustment of the rough-machining tool with these values can be carried out in the aforementioned manner, while the finish-machining tool can be controlled with the saved values as a function of the course of the outer or inner diameter.

It is also possible to determine the course of the outer or inner diameter with a sensing device after the rough-machining process and before the finish-machining process so that the determined values can be used only for controlling the position-exact and dimension-exact machining of the chamfer in the finish-machining process.

Furthermore, it is possible to determine the course of the outer or inner diameter during the finish-machining process with a sensing device and to use the values directly for controlling the dimension-exact manufacture of the chamfer in the finish-machining process as function of the course of the outer or inner diameter. In this case, the sensing device functions as a tracing sensor and can be operatively coupled with the machining tool directly mechanically or indirectly hydraulically or electrically via the control device.

In order to prevent that for thin-walled, especially welded pipes, which may have a great deviation from roundness, respectively, a greatly oval contour, a rough-machining process for an oval contour that surpasses the wall thickness, respectively, deviation from roundness, cannot be performed over the entire circumference of the pipe, it is advantageous to employ a clamping device for radially clamping the pipe end with which the non-round, respectively, oval pipe end is radially deformed such that practically a circular contour results.

When the thin walled, especially welded pipes have a substantially uniform wall thickness, a sensing of the course of the outer and inner diameter is not required; instead, the rough-machining process and the finish-machining process can be performed as a function of the measured actual outer or inner diameter.

Since, in general, relatively long pipes are to be provided with a chamfer at a pipe end, such a pipe must be supported additionally at an area where it extends from the clamping device. Depending on the location of the pipe where the support is arranged, the pipe may bend so that the axis of the clamped pipe end is not exactly horizontally arranged. Furthermore, a deviation from the horizontal can result when the actual diameter deviates from the nominal diameter and the support for the pipe and clamping device are aligned according to the nominal diameter so that at the support, supporting the pipe from below at the outer circumference, a height deviation results. In order to compensate for this height deviation, the axis of the clamped pipe end can advantageously be adjusted horizontally by determining the actual outer or the actual inner diameter and by correcting the height adjustment of the support relative to the clamping device corresponding to the deviation of the outer or inner diameter of the pipe from the nominal value. In this manner, the end face of the clamped pipe end is always machined perpendicular to the pipe axis at this location.

The device for position-exact and dimension exact chamfering of a clamped pipe end with respect to the outer or inner diameter of the pipe can inventively be comprised of a clamping device for a pipe end, one or more chamfering tools, adjustable relative to the clamping device and rotatable about the pipe axis as well as radially adjustable, a sensing device rotatable relative to the clamping device about the axis of the pipe for determining the outer and/or inner diameter as well as the course of the outer and/or diameter along the circumference of the pipe, and a control device operatively connected to the sensing device for adjusting the chamfering tool during position-exact and dimension-exact machining of the chamfer in the finish-machining process as a function of the course of the outer or inner diameter. In this context it is, in general, without consequence whether the chamfering tool and the sensing device a stationary and the pipe is rotated with the clamping device for performing the chamfering process or vice versa.

The measuring of the actual outer diameter of the pipe can be simply achieved in that the clamping device is provided with a clamping piston that is axially displaceable and actuates radial clamping jaws, and a travel pick-up coupled therewith, whereby the travel of the clamping piston determined by the travel pick-up is a measure for the actual outer diameter.

When a thin-walled pipe is pressed to a substantially circular contour with the clamping device, the measured actual outer diameter can be directly used to control the rough-machining process and the finish-machining process. An additional sensing device in operative connection with a control device for adjusting the chamfering tool during dimension-exact machining of the chamfer in a finish-machining process as a function of the course of the outer or inner diameter is then no longer required.

In this case, the machining of the chamfer can be performed by taking into account the course of the actual outer, respectively, inner diameter or based only on, especially for thin-walled welded pipes, the measured actual outer or inner diameter, whereby this can be done in a single process or by first performing a rough-machining process.

Because of the great pipe length and the resulting great mass of the pipe, which, in general, also has considerable imbalance, it is advantageous to position the pipe stationarily within the clamping device and to connect the chamfering tool or tools so as to be radially adjustable to a planar disc arranged coaxially to the clamping device and driven in rotation, with the sensing device also arranged thereat.

In order to be able to clamp each pipe in the same position relative to the clamping device, the clamping device can have arranged thereat an abutment which is outwardly pivotable.

This abutment can be axially displaceable to a limited extend and may be provided with a travel pick-up for determining the actual position of the clamped end face of the pipe with respect to the chamfering tool, respectively, chamfering tools. This is advantageous because the chamfering tool, respectively, tools can then be advanced directly and quickly and without safety margin to the plane of machining.

In this case, the production of the chamfer can be performed while taking into account the course of the actual outer or actual inner diameter or, especially for thin walled, welded pipes, only of the measured actual outer or, inner diameter. This can be done in a single machining step or with a separate rough-machining process.

In order to prevent damage to the chamfering tool at the planar disc and the sensing device by the pivotable abutment, the planar disc with its drive unit can advantageously be axially displaceably mounted relative to the clamping device on a base plate.

For supporting a long pipe, a support for the pipe, spaced from the clamping device and height-adjustable relative thereto, can be provided.

Additionally, the clamping device and the planar disc with its drive can be arranged on a lifting table whereby the support and the lifting table each are provided with a height-adjusting mechanism that, with a control device, can be adjusted, relative to the nominal diameter of the pipe, to the same pipe axis level in the area of the support device and the clamping device and, subsequently, can be adjusted relative to one another, after determination of the actual diameter with the travel pick-up or the sensing device, to a horizontal position of the axis of the clamped pipe end as a function of the determined actual diameter.

The sensing device can be a contacting or contactless tracing sensor and can be operatively connected to the chamfering tool whereby the tracing sensor is either mechanically directly coupled to the chamfering tool or is operatively connected via the control device to the chamfering tool.

The rough-machining process and the fine-machining process can be performed with the same chamfering tool so that these two machining steps differ from one another only in their advance rate. Preferably, however, a radially adjustable chamfering tool for the rough-machining process is connected to the planar disc, and a chamfering tool for the finish-machining process is connected to the planar disk so as to be staggered relative to the chamfering tool for the rough-machining process and radially adjustable in a controlled manner by the sensing device. These two chamfering tools can be positioned radially staggered at the same tool holder or can be connected, displaced relative to the circumference, preferably by 180°, to different tool holders which have independent drives for radial adjustment.

BRIEF DESCRIPTION OF THE DRAWINGS

The invention will be described in more detail subsequently with the aid of the drawing representing inventive embodiments.

DESCRIPTION OF PREFERRED EMBODIMENTS

Figure 1:
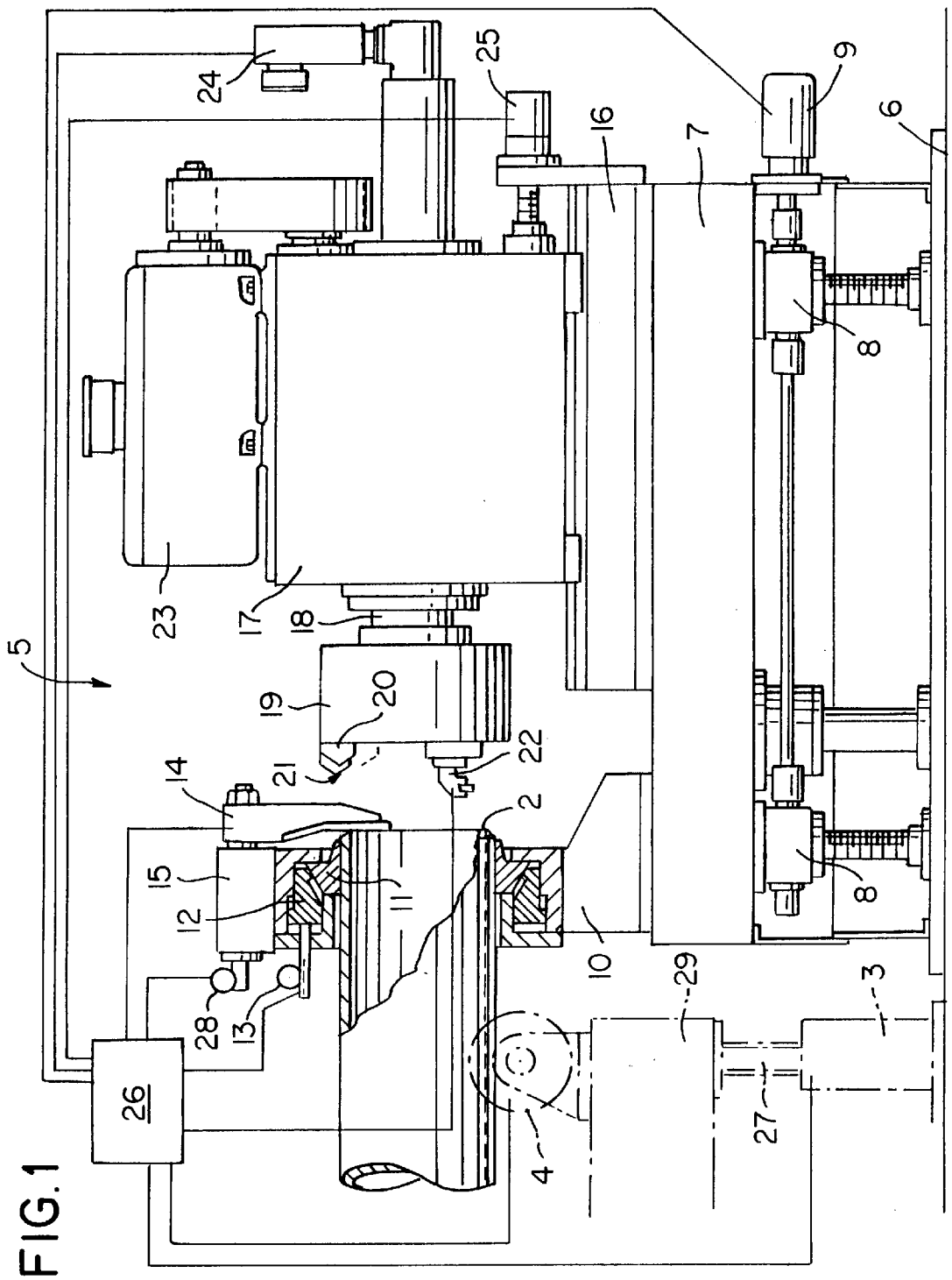

A tube 1, the end face 2 of which is to be provided with a chamfer, for example, a welding chamfer, rests with its outer circumference at the support roller 4, which is supported by a height-adjusting mechanism 27 at a tubular support 3, and is secured with one end in a clamping device 10. A plurality of support rollers 4 can be arranged along a support structure 29 above a plurality of tubular supports 3 and height-adjusting mechanisms 27 whereby the represented first support roller 4 has a greater distance to the clamping device 10 than shown. The clamping device 10 is part of a chamfering machine 5 which is arranged on a foundation 6, as are the tubular supports 3. A lifting table 7 is supported by lifting devices 8 on the foundation 6 whereby the lifting table 7 can be height-adjusted with a drive unit 9 acting on the lifting devices 8.

The clamping device 10 connected to the lifting table 7 has radial clamping jaws 11 which clamp the end of the pipe 1 when a clamping piston 12 is axially displaced so that the clamping jaws 11 with conical surfaces arranged between the clamping piston 12 and the clamping jaws 11 are radially clamped at the pipe 1. A travel pick-up 13 is connected to the clamping piston 12 so that from the axial displacement of the clamping piston 12 the actual outer diameter of the pipe can be determined.

An abutment 14 is pivotably supported at the clamping device 10 and is pivoted into the area of the end face 2 of the pipe 1 when a new pipe 1 is introduced into the clamping device 10 in order to machine a chamfer thereat. For this purpose, the pipe 1 is moved with a advancing device acting on the support roller 4, or a separate driving unit acting directly on the pipe 1, until it contacts the abutment 14. Subsequently, the clamping device 10 is actuated in order to clamp the pipe end. After clamping of the pipe end, the abutment 14 is pivoted out of the area of the end face 2 of the pipe 1. The abutment 14 can be supported so as to be axially displaceable against a spring force so that a travel pick-up coupled with the shaft 15 provides a position indication of the end face 2 of the pipe 1 relative to the clamping device 10.

A gear box housing 17 for a spindle 18 with a planar disc 19 is axially displaceable on guide rails 16 of the lifting table 7. The axis of rotation of the spindle 18 and of the planar disc 19 is coaxial to the clamping device 10. One or more radially displaceable tool holders 20 are arranged on the planar disc 12 for a chamfering tool 21.

In the represented embodiment a measuring, respectively, sensing device 22 is arranged diametrically opposite the chamfering tool 21 on the planar disc and rotates thus with the planar disk 19.

A spindle drive motor 23, which can be adjusted to a selected rotational speed, is connected to the gear box housing 17 which, in a manner known per se, rotates with V-belts or tooth belts and toothed wheels the spindle 18 and the planar disc 19. An advancing drive 24 for the tool holder 20 engages axially the hollow spindle 18 and transmits its axial movement via individual non-represent intermediate elements, in a manner known per se, into a radial advancing movement of the tool holder 20. A further advancing drive 25 which is connected to the lifting table 7 and engages the drive housing 17, effects the axial displacement of the gear box housing 17 and thus of the planar disc 19 with the tool holder 20 and the chamfering tool 21.

A control device 26, preferably in the form of a CNC control, is connected via signal lines and control lines with the clamping device 10, the travel pick-ups 13 and 28, a pivot drive for the abutment 14, the drive motor 23 for the planar disc 19, the advancing drive 24 for the tool holder 20, the advancing drive 25 for the axial displacement of the gear box housing 17, the drive unit 9 for the lifting table 7, the drive for the support roller 4, and the height-adjusting mechanism 27 within the tubular support 3.

When a batch of pipes 1, which are delivered with a certain nominal diameter, are to be provided with a welding chamfer, each pipe is placed onto the support roller 4 of the tubular support 3 and pushed with the end face 2 through the clamping device 10 until the end face 2 abuts the abutment 14. Subsequently, the clamping device 10 is actuated with the control device 26 by pressure-loading the clamping piston 12 and axially displacing it. The wedge surfaces between the clamping piston 12 and the clamping jaws 11 effect that the clamping jaws 11 contact radially the pipe end for clamping it therebetween.

Before clamping of a pipe 1 takes place, the support rollers 4 are adjusted with the height-adjusting mechanism 27 and the clamping device 10 with the drive unit 9 of the lifting device 8 at the lifting table 7 to a height which effects a horizontal position of the pipe axis with respect to the nominal diameter of the pipe. This height adjustment is controlled by the control device 26. During this control action an optionally occuring bending of the pipe 1 is already taken into account which bending may result from the own weight of the pipe 1 and the distance between the clamping device 10 and the support roller 4. It is important that the axis of the pipe in the area of the clamping device 10 be horizontally arranged and this can be achieved with sufficient precision when a plurality of support rollers 4 is arranged along the support structure 29.

After clamping the pipe 1 in the clamping device and measuring with the travel pick-up 28 the position of the end face 2 in the clamping device 10, the abutment 14 is pivoted out of the area of the end face 2 of the pipe 1 so that the gear box housing 17 with the spindle 18, the planar disc, the tool holder 20, the chamfering tool 21, and the measuring, respectively, sensing device 22 can be advanced into the vicinity of the end face 2 of the pipe 1 by the advancing drive 25. With the control device 26 the planar disc 19 is rotated and with the measuring, respectively, sensing device 22 the actual inner diameter, and optionally the outer diameter, of the pipe 1 is measured if it has not yet been determined with the travel pick-up 13, as mentioned above. If the actual outer or inner diameter of the pipe 1 deviates from the nominal diameter, this results in a different height of the axis of the pipe within the clamping device 10 and in the area of the support roller 4 which results in a deviation of the axial position in the clamping device 10 from the horizontal. With the control device 26 a height adjustment of the lifting table 7 or of the support roller(s) 4 by actuating the drive unit 9 for the lifting device 8 or the height-adjusting mechanism 27. This height adjustment, in orientation and magnitude, is selected such that the pipe axis in the area of the clamping device 10 will be horizontal so that chamfering is carried out exactly perpendicular to the axis of the pipe.

Simultaneously to measuring the actual diameter of the pipe 1 with the measuring or sensing device 22, the course of outer or inner diameter along the circumference of the pipe can also be determined and saved within the control device 26.

For performing the rough-machining process the chamfering tool 21, controlled by the control device 26, is advanced by radial displacement of the tool holder 20 into the area of the end face 2 and the planar disc 19 is rotated at a fast speed corresponding to the machining speed during rough-machining. The chamfering tool 21 with the tool holder 20 is advanced radially and displaced at an advance rate for the rough-machining process until the required machining allowance for a subsequent finish-machining process has been reached. This machining allowance can be calculated from the determined values of the outer or inner diameter along the circumference of the pipe and can be adjusted via the control device 26 at the tool holder 20 with a corresponding displacement of the advancing drive 24.

After the rough-machining process has been completed in this manner within a shortest possible time, the finish-machining process is started. The finish-machining process is carried out with a reduced advance rate with minimal cutting in order to achieve the required surface quality as well as position precision and dimension precision. The rough-machining process and the finish-machining process can be performed with the same or with different tools. Since the chamfer must be produced position-exact and dimension-exact relative to the outer or inner diameter (for a welding chamfer the chamfer must be position-exact and dimension exact relative to the inner diameter of the pipe 1), the advance rate of the finish-machining process is terminated when the preselected specifications have been reached whereby this finish-machining process is performed such that the chamfering tool 21 at the tool holder 20 is radially guided, corresponding to the course of the inner diameter, with the aid of the control device 26. Since the pipe 1 in the clamping device is clamped with its outer surface, the inner tube surface relative to the exterior tube surface may be eccentric and can rotate non-circularly. Since, however, the course of the inner diameter can be determined by the measuring or sensing device and can be saved in the control device 26, the tool holder 20 with the chamfering tool 21 can be corrected with the advancing drive 24 exactly corresponding to the course of the inner diameter of the pipe so that the chamfer can be produced position-exact and dimension-exact relative to the inner surface of the pipe.

The afore-described operational mode of the inventive chamfering machine relates to a CNC control with a control device 26 that takes into account all adjustments and processes. It is possible to simplify such a CNC control or to eliminate it entirely.

For example, in order to position the axis of the pipe in the area of the clamping device 10 horizontally, the actual diameter of the clamped pipe 1 can be measured by hand and the support roller 4 or lifting table 7 can be manually height-adjusted. Also, an abutment at the planar disc 19 can be adjusted due to the measured actual diameter such that the chamfering tool preforms the rough-machining process with a machining allowance for the finish-machining process which is sufficient for all circumstances.

The finish-machining process can then be preformed with a further chamfering tool arranged at the planar disc 19 connected to a radially adjustable tool holder which has connected thereto a sensing device which rests at the inner wall of the pipe so that the finish-machining process can be performed as a mechanical tracing process with respect to the inner diameter of the pipe.

When it is desired to use only one tool holder 20, it is possible to arrange at the tool holder 20 two radially displaced chamfering tools one of which is to be used for the rough-machining process and the other for the fine-machining process.

The sensing device can be a tracing sensor, as mentioned above, which is directly mechanically coupled to the tool holder 20; however, it can also be a contactless operating device operatively connected via the control device 26 to the drive of the tool holder 20.

With the inventive method and device it is thus possible with a mechanical control as well as with a CNC control to provide pipe ends with precision-exact and dimension-exact chamfers, independent of whether seamless or welded pipes are to be chamfered.

Since the clamping device 10 is able to provide considerable clamping forces, it is possible to press pipes that have great deviations from roundness, respectively, are greatly oval, into a practically circular shape with radially activated clamping jaws 11. This is possible especially for thin-walled, welded tubes and accelerates and simplifies the chamfering process because the chamfering tool 21 must no longer travel long radial strokes as a function of the outer or inner pipe diameter when running along the circumference.

When these circularly pressed pipes have a substantially uniform wall thickness, it is sufficient to measure the actual outer or inner diameter of the pipe end and to control the rough-machining process and the finish-machining process as a function of this actual diameter in order to apply a welding chamfer quickly and dimension-exact as well as position-exact to the pipe end. When the clamping piston 12, as already disclosed, is coupled with a travel pick-up 13, the actual outer diameter of the pipe can be calculated directly from the travel of the clamping piston 12 and can be used for controlling the chamfering tool 21 at the tool holder 20. An additional sensing device 22 at the planar disk 19 is no longer necessary in this case or, if present, must not be employed.

The represented device which has a travel pick-up 13 as well as a sensing device 22, can thus be used, on the one hand, for chamfering thin-walled pipes with uniform wall thickness, especially welded pipes, which are pressed with a clamping device 10 into a circular shape, without needing the sensing device 22, when via the travel pick-up 13 the actual outer pipe diameter is determined and the chamfering tool 21 at the tool holder 20 is correspondingly controlled by the control device 26. On the other hand, the same device can also be used for chamfering thick-walled seamless pipes when the course of the inner diameter of the tube is sensed with the sensing device 22 and used for controlling the chamfering tool 21 at the tool holder 20 via control device 26. In this case, the travel pick-up 13 must not be used or can be used for adjusting the rough-machining process, while the sensing device 22 can be used only for controlling the finish-machining process.

Furthermore, the chamfering process can be accelerated and simplified when the actual position of the clamped end face 2 of the pipe 1 with respect to the chamfering tool 21 or tools is determined with a sensing device in the form of the pick-up 28 connected to the abutment 14. Due to the determination of the actual position of the clamped end face 2 of the pipe, the chamfering tool 21 can be advanced to the end face 2 of the pipe in a fast and exact manner and can then perform at least the rough-machining process at great advancing speeds as a function of, for example, the outer pipe diameter measured by the travel pick-up 13, while the finish-machining process is performed in the disclosed manner as a function of the course of the inner diameter of the pipe by using the sensing device 22. For thin-walled pipes with minimal wall thick tolerances the finish-machining process can be performed exclusively as a function of the measured actual outer or inner diameter with sufficient positional and dimensional precision, optionally by first performing a fast rough-machining process.

The present invention is, of course, in no way restricted to the specific disclosure of the specification and drawings, but also encompasses any modifications within the scope of the appended claims.

What is claimed is:

1. A device for machining a chamfer at a pipe end, said device comprising:
   a clamping device for the pipe end;
   at least one radially adjustable machining tool rotatable relative to said clamping device about an axis of the pipe end;
   a sensing device rotatable relative to said clamping device about the axis of the pipe end for determining at least one of the actual inner diameter of the pipe and the actual outer diameter of the pipe and the course of one of the actual inner diameter and the actual outer diameter about the circumference of the pipe;
   a control device connected to said sensing device for adjusting the at least one machining tool for exact positional and dimensional chamfering as a function of the course of the one of the actual inner diameter and the actual outer diameter about the circumference of the pipe;
   said clamping device comprising an axial displaceable clamping piston for actuating radially acting clamping jaws;
   a first travel pick-up for determining the actual outer diameter of the pipe based on the travel of the clamping piston.

2. A device according to claim 1, further comprising:
   an abutment moveable axially toward the pipe end;
   a second travel pick-up connected to said abutment for determining the actual position of the clamped pipe end relative to said at least one machining tool.

3. A dedvice according to claim 1, further comprising a planar disk, wherein said at least one machining tool has a drive and wherein said planar disk is connected to said machining tool and is driven by said drive of said machining tool, wherein said planar disk is arranged and driven coaxially to said clamping device.

4. A device according to claim 3, wherein said sensing device is connected to said planar disk.

5. A device according to claim 3, wherein said planar disk comprises a drive unit, said device further comprising a base plate to which said planar disk and said drive unit are connected so as to be axially displaceable relative to said clamping device.

6. A device according to claim 5, further comprising a height-adjustable support for the pipe spaced from said clamping device.

7. A device according to claim 6, further comprising a lifting table, wherein said clamping device and said planar disk with said drive unit are connected to said lifting table.

8. A device according to claim 7, wherein said lifting table and said height-adjustable support each have a height-adjusting mechanism connected to said control device, wherein said height-adjusting mechanisms are positioned at a same level as the axis of the pipe end relative to a nominal diameter of the pipe and, subsequently, after determination of the actual diameter of the pipe with one of said first pick-up and said sensing device, are adjusted to effect a horizontal position of the axis of the pipe end in the clamping device as a function of the determined actual diameter.

9. A device according to claim 1, wherein said sensing device is a tracing sensor operatively connected to said at least one machining tool.

10. A device according to claim 9, wherein said sensing device is a mechanical tracing sensor directly coupled to said at least one machining tool.

11. A device according to claim 9, wherein said tracing sensor is operatively coupled via said control device to said at least one machining tool.

12. A device according to claim 11, wherein said sensing device is selected from the group consisting of a contactless tracing sensor and a contacting tracing sensor.

13. A device according to claim 3, wherein said at least one machining tool comprises a rough-machining tool radially displaceably connected to said planar disk and a finish-machining tool radially displaceable connected to said planar disk so as to be displaced relative to said rough-machining tool, wherein radial displacement of said finish-machining tool is controlled by said sensing device.

* * * * *